United States Patent [19]
Gramelspacher

[11] Patent Number: 6,073,921
[45] Date of Patent: Jun. 13, 2000

[54] WREATH MAKING SUPPORT STAND

[76] Inventor: Mary Gramelspacher, 1628 W. Division Rd., Jasper, Ind. 47546

[21] Appl. No.: 09/138,384

[22] Filed: Aug. 24, 1998

[51] Int. Cl.⁷ ...................................................... B23Q 1/00
[52] U.S. Cl. ............................................................ 269/47
[58] Field of Search ..................... 269/47, 909; 29/281.1, 29/281.5, 283; 248/125.3, 215, 205.1; 211/196

[56] References Cited

U.S. PATENT DOCUMENTS

| | | | |
|---|---|---|---|
| D. 305,299 | 1/1990 | Freeman | 248/215 |
| 3,955,787 | 5/1976 | Brown | 211/196 |
| 4,317,554 | 3/1982 | Winger | 248/205 A |
| 5,607,130 | 3/1997 | Smay et al. | 248/125.3 |

*Primary Examiner*—Robert C. Watson

[57] ABSTRACT

A wreath making support stand including a vertical tube having an upper end, a lower end, and an intermediate extent therebetween. An upper arm is secured to and extends outwardly from the upper end of the vertical tube. A lower arm is secured to and extends outwardly from the intermediate extent of the vertical tube. The lower arm is disposed intermediate the upper and lower ends of the vertical tube. A wreath frame is selectively positionable on the upper arm and the lower arm for securing craft materials thereto.

1 Claim, 2 Drawing Sheets

WREATH MAKING SUPPORT STAND

BACKGROUND OF THE INVENTION

1. Field of the Invention

The present invention relates to a wreath making support stand and more particularly pertains to supporting a wreath frame for decorating with a wreath making support stand.

2. Description of the Prior Art

The use of craft stands is known in the prior art. More specifically, craft stands heretofore devised and utilized for the purpose of supporting workpieces are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,330,143 to Rich et al.; U.S. Pat. No. 4,501,080 to Rich; U.S. Pat. No. 3,955,722 to Bard; U.S. Pat. No. 5,119,572 to Graham; U.S. Pat. No. 4,175,343 to Mathews; and U.S. Pat. No. Des. 357,826 to Fiddament.

While these devices fulfill their respective, particular objective and requirements, the aforementioned patents do not describe a wreath making support stand for supporting a wreath frame for decorating.

In this respect, the wreath making support stand according to the present invention substantially departs from the conventional concepts and designs of the prior art, and in doing so provides an apparatus primarily developed for the purpose of supporting a wreath frame for decorating.

Therefore, it can be appreciated that there exists a continuing need for new and improved wreath making support stand which can be used for supporting a wreath frame for decorating. In this regard, the present invention substantially fulfills this need.

SUMMARY OF THE INVENTION

In the view of the foregoing disadvantages inherent in the known types of craft stands now present in the prior art, the present invention provides an improved wreath making support stand. As such, the general purpose of the present invention, which will be described subsequently in greater detail, is to provide a new and improved wreath making support stand and method which has all the advantages of the prior art and none of the disadvantages.

To attain this, the present invention essentially comprises a vertical tube having a generally cylindrical configuration. The vertical tube has an upper end, a lower end, and an intermediate extent therebetween. The lower end has a generally square base secured thereto. The base supports the vertical tube in an upright orientation. The vertical tube has a length of about thirty-six inches and a diameter of about two inches. The square base has about eight inch edges and a thickness of about ¾ of an inch. An upper arm is secured to and extends outwardly from the upper end of the vertical tube. The upper arm is generally planar and has a rectangular configuration. The upper arm has a length of about ten inches and a width of about four inches. A lower arm is secured to and extends outwardly from the intermediate extent of the vertical tube. The lower arm is disposed intermediate the upper and lower ends of the vertical tube. The lower arm is generally planar and has a rectangular configuration. The lower arm has a length of about seven inches and a width of about four inches. A wreath frame is selectively positionable on the upper arm and the lower arm for securing craft materials thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wreath making support stand which has all the advantages of the prior art craft stands and none of the disadvantages.

It is another object of the present invention to provide a new and improved wreath making support stand which may be easily and efficiently manufactured and marketed.

It is a further object of the present invention to provide a new and improved wreath making support stand which is of durable and reliable construction.

An even further object of the present invention is to provide a new and improved wreath making support stand which is susceptible of a low cost of manufacture with regard to both materials and labor, and which accordingly is then susceptible of low prices of sale to the consuming public, thereby making such a wreath making support stand economically available to the buying public.

Even still another object of the present invention is to provide a new and improved wreath making support stand for supporting a wreath frame for decorating.

Lastly, it is an object of the present invention to provide a new and improved wreath making support stand including a vertical tube having an upper end, a lower end, and an intermediate extent therebetween. An upper arm is secured to and extends outwardly from the upper end of the vertical tube. A lower arm is secured to and extends outwardly from the intermediate extent of the vertical tube. The lower arm is disposed intermediate the upper and lower ends of the vertical tube. A wreath frame is selectively positionable on the upper arm and the lower arm for securing craft materials thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
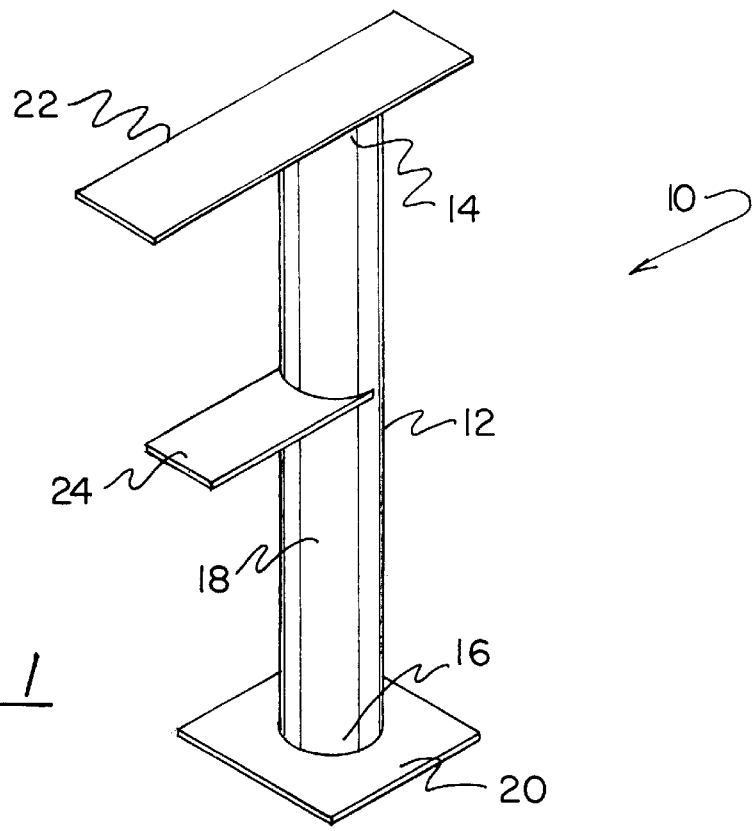
FIG. 1 is a perspective view of the preferred embodiment of the wreath making support stand constructed in accordance with the principles of the present invention.
Figure 2:
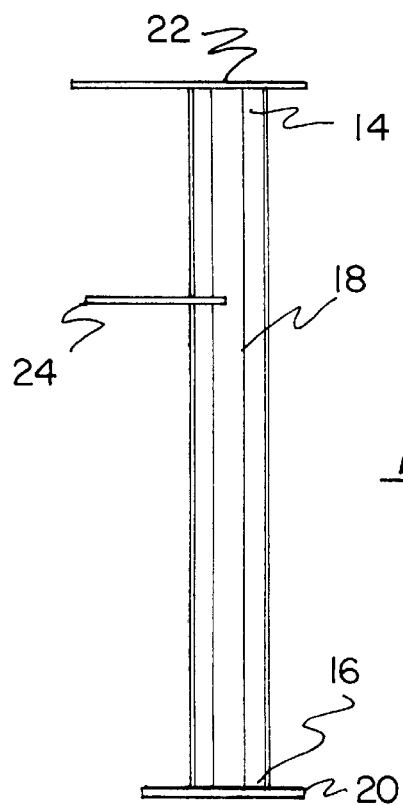
FIG. 2 is a side elevation view of the present invention shown in FIG. 1.
Figure 3:
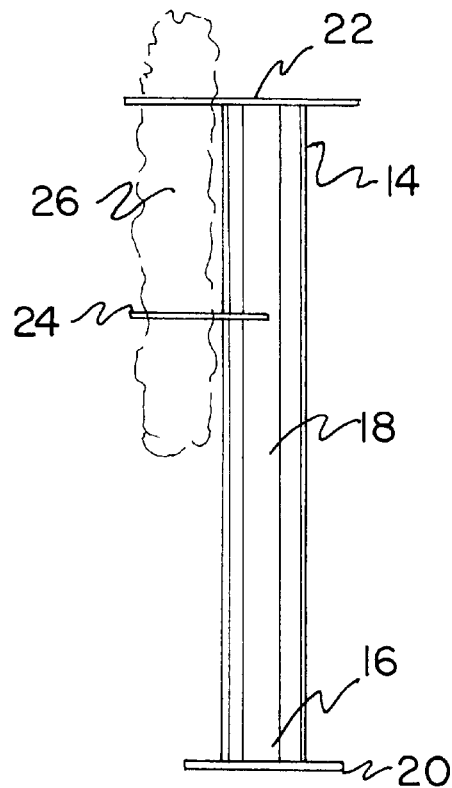
FIG. 3 is a side view of the present invention illustrated supporting a wreath frame.
Figure 4:
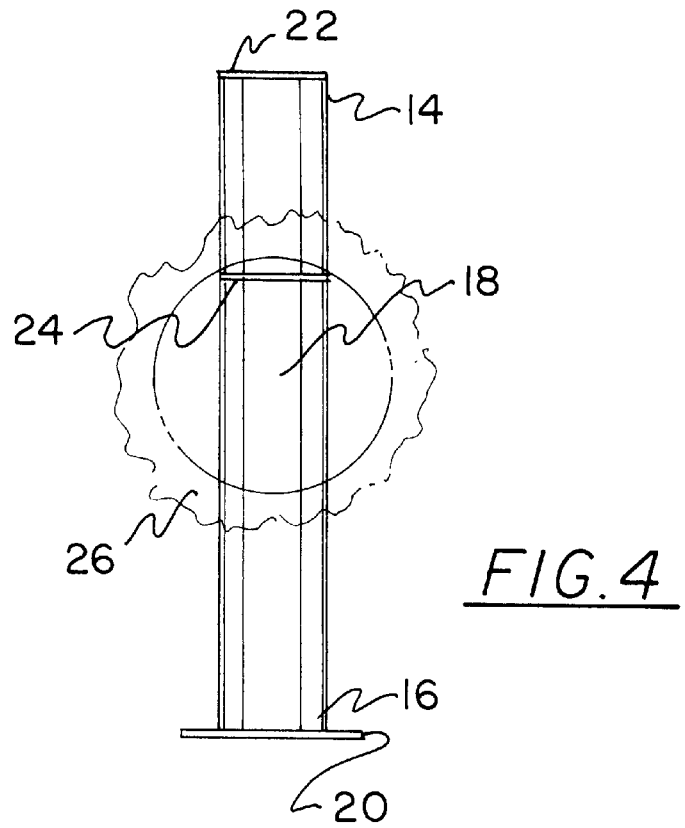
FIG. 4 is front view of the present invention illustrated supporting a wreath frame.

With reference now to the drawings, and in particular, to FIGS. 1 through 4 thereof, the preferred embodiment of the new and improved wreath making support stand embodying the principles and concepts of the present invention and generally designated by the reference number 10 will be described.

Specifically, it will be noted in the various Figures that the device relates to a wreath making support stand for supporting a wreath frame for decorating. In its broadest context, the device consists of a vertical tube, an upper arm, a lower arm, and a wreath frame. Such components are individually configured and correlated with respect to each other so as to attain the desired objective.

The vertical tube 12 has a generally cylindrical configuration. The vertical tube 12 has an upper end 14, a lower end 16, and an intermediate extent 18 therebetween. The lower end 16 has a generally square base 20 secured thereto. The base 20 supports the vertical tube 12 in an upright orientation. The vertical tube 12 has a length of about thirty-six inches and a diameter of about two inches. The square base 20 has about eight inch edges and a thickness of about ¾ of an inch.

The upper arm 22 is secured to and extends outwardly from the upper end 14 of the vertical tube 12. The upper arm 14 is generally planar and has a rectangular configuration. The upper arm 14 has a length of about ten inches and a width of about four inches.

The lower arm 24 is secured to and extends outwardly from the intermediate extent 18 of the vertical tube 12. The lower arm 24 is disposed intermediate the upper and lower ends 14,16 of the vertical tube 12. The lower arm 24 is generally planar and has a rectangular configuration. The lower arm 24 has a length of about seven inches and a width of about four inches. An inner edge of the lower arm has an arcuate cut-out to allow for the lower arm to conform to the shape of the vertical support 12. Thus, the lower arm 24 can be placed against the vertical support 12 in an abutting relationship to allow for it's securement to the vertical post 12. The lower arm 24 could also be positioned at various locations along the intermediate extent 18 to accommodate various uses.

The wreath frame 26 is selectively positionable on the upper arm 22 and the lower arm 24 for securing craft materials thereto. Note FIGS. 3 and 4.

Wreaths being created, decorated, or changed can be hung from the upper arm 22, for large wreaths, or from the lower arm 24, for smaller wreaths. This allows the user to keep both hands free, and eliminates the uncomfortableness of leaning over a table to work on a wreath that is lying flat. In addition, because the present invention suspends the wreath frame 26 in the air, it is much easier to attach craft materials from all sides. The present invention could also be used to display a completed wreath.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A wreath making support stand for supporting a wreath frame for decorating comprising, in combination:

a vertical tube having a generally cylindrical configuration, the vertical tube having an upper end, a lower end, and an intermediate extent therebetween, the lower end having a generally square base secured thereto, the base supporting the vertical tube in an upright orientation, the vertical tube having a length of about thirty-six inches and a diameter of about two inches, the square base having about eight inch edges and a thickness of about ¾ of an inch;

an upper arm secured to and extending outwardly from the upper end of the vertical tube, the upper arm being generally planar and having a rectangular configuration, the upper arm having a length of about ten inches and a width of about four inches;

a lower arm secured to and extending outwardly from the intermediate extent of the vertical tube, the lower arm being disposed intermediate the upper and lower ends of the vertical tube, the lower arm being generally planar and having a rectangular configuration, the lower arm having a length of about seven inches and a width of about four inches; and a wreath frame selectively positionable on the upper arm and the lower arm for securing craft materials thereto.

* * * * *